United States Patent
Liu et al.

(10) Patent No.: US 7,586,724 B2
(45) Date of Patent: Sep. 8, 2009

(54) ADAPTIVE CURRENT LIMITER FOR WIRELESS MODEM

(75) Inventors: Ping Liu, Surrey (CA); Bruce Miller, Coquitlam (CA); Golnaz Sanaie-fard, Coquitlam (CA)

(73) Assignee: Sierra Wireless, Inc., Richmond, BC (CA)

( * ) Notice: Subject to any disclaimer, the term of this patent is extended or adjusted under 35 U.S.C. 154(b) by 0 days.

(21) Appl. No.: 11/490,930

(22) Filed: Jul. 21, 2006

(65) Prior Publication Data

US 2007/0035895 A1 Feb. 15, 2007

Related U.S. Application Data

(63) Continuation of application No. 10/305,634, filed on Nov. 27, 2002, now Pat. No. 7,106,569.

(51) Int. Cl.
H02H 3/08 (2006.01)
H02H 9/02 (2006.01)
(52) U.S. Cl. ............ 361/93.1; 361/93.2; 361/93.9
(58) Field of Classification Search ........ 361/93.1, 361/93.2, 93.9
See application file for complete search history.

(56) References Cited

U.S. PATENT DOCUMENTS

| | | | |
|---|---|---|---|
| 4,713,607 A | 12/1987 | Pepper | |
| 4,713,809 A | 12/1987 | Mizota | |
| 4,720,758 A | 1/1988 | Winslow | |
| 5,239,164 A * | 8/1993 | Hirota | 219/492 |
| 5,650,973 A | 7/1997 | Moyer et al. | |
| 5,777,894 A * | 7/1998 | Settles et al. | 700/295 |
| 5,896,574 A | 4/1999 | Bass, Sr. | |
| 5,914,545 A * | 6/1999 | Pollersbeck | 307/131 |
| 5,983,288 A | 11/1999 | Visee | |
| 6,011,323 A * | 1/2000 | Camp | 307/64 |
| 6,304,215 B1 | 10/2001 | Proctor, Jr. et al. | |
| 6,785,830 B1 | 8/2004 | McKeen et al. | |
| 6,806,728 B2 | 10/2004 | Nguyen et al. | |
| 6,911,868 B1 | 6/2005 | Kumar DVJ | |

FOREIGN PATENT DOCUMENTS

| | | |
|---|---|---|
| EP | 0 717 341 | 6/1996 |
| GB | 2 310 570 | 2/1996 |
| JP | 1087535 A1 | 3/2001 |
| WO | WO 03/014855 | 2/2003 |

OTHER PUBLICATIONS

Detailed Overview of the PC Card Standard (PCMCIA Standards), 1998 PCMCIA website.
Goodenough, Frank, "Host CPU's IC Manages Power for PCMCIA Cards", Sep. 5, 1994, 2328 Electronic Design 42, No. 18, 4 pages.
International Search Report dated Apr. 2, 2004, Application No. PCT/CA03/01817.
"MIC2545A/2549A Programmable Current Limit High-Side Switch", M9999-041204, Apr. 2004, Micrel Inc., San Jose CA usa.

* cited by examiner

*Primary Examiner*—Stephen W Jackson
*Assistant Examiner*—Zeev Kitov
(74) *Attorney, Agent, or Firm*—Nixon Peabody LLP

(57) ABSTRACT

Method and apparatus for preventing current overdraw by a wireless modem sinking current from a host power supply of a host device (e.g. laptop computer or personal digital assistant (PDA)). The methods and apparatuses are applicable, but not limited to Personal Computer Memory Card International Association (PCMCIA) wireless modems and Global System for Mobile Communications/General Packet Radio Service (GSM/GPRS) wireless networks.

13 Claims, 3 Drawing Sheets

ADAPTIVE CURRENT LIMITER FOR WIRELESS MODEM

CROSS-REFERENCE TO RELATED APPLICATIONS

This application is a continuation of prior U.S. patent application Ser. No. 10/305,634, entitled "Adaptive Current Limiter for Wireless Modem," filed on Nov. 27, 2002, which issued as U.S. Pat. No. 7,106,569.

FIELD OF THE INVENTION

The present invention relates generally to wireless communications technologies. More particularly, the present invention relates to controlling the current draw of a wireless Modem from a host power supply.

BACKGROUND OF THE INVENTION

Integrated circuit cards (or "PC cards") are often used in mobile communications and computing. In one particular application, the PC card comprises a wireless modem that plugs into a PCMCIA slot of a laptop computer or personal digital assistant (PDA). PCMCIA is an acronym for "Personal Computer Memory Card International Association", which sets forth standards for PC cards. Typically, the host device (i.e. laptop or PDA) is coupled to a direct current to direct current (DC/DC) converter, which converts the host power supply voltage to a voltage source that powers the PC card.

For efficient use of the converted power by the wireless modem, the output impedance of the PC card must be well matched to the input impedance of the modem antenna. An impedance mismatch can occur if the antenna is not oriented for proper transmission, is broken or is in contact with an object that inhibits its ability to radiate radio frequency (RF) power. A consequence of the mismatch is the transmission of a weak RF signal and the possibility of the following two scenarios occurring. First, the power control loop of the power amplifier (PA) in the wireless modem will act to increase the PA output power to compensate PA output loss due to antenna mismatch. Second, when the base station of the wireless network receives the weak RF signal, the base station will send a request for the modem to increase its output power, not knowing that the weak signal is attributable to the antenna mismatch. Both of these scenarios may result in the PA of the wireless modem drawing excessive current from the host power supply, i.e., more current than the supply is designed to properly supply. This phenomenon is often referred to as "current overdraw." Current overdraw is undesirable since it can damage the power supply, cause the host device to reset, and/or cause the modem to overheat.

A solution to preventing current overdraw would be to use a fixed hardware limiter to limit the power amplifier DC power rail. Unfortunately, this solution has two problems. First, conventional hardware current limiters only guarantee about a 20% threshold accuracy. This degree of uncertainty in accuracy may be too large to manage and prevent current overdraw by the power amplifier. Second, using a fixed hardware limit may result in the sending of a "false alarm" of a current overdraw condition to a host that may, in fact, have the ability to deliver a particular current draw demand (i.e. a "strong" power supply). Conversely, using a fixed hard limit may result in the sending of no warning at all of a current overdraw condition to a host that may not have the ability to deliver a particular current draw demand (i.e. a "weak" power supply). These problems would be compounded in multiple-time-slotted systems, in which current demands vary depending on the number of transmission slots allocated per transmission burst.

SUMMARY OF THE INVENTION

Generally, the methods and apparatuses of the present invention relate to wireless modems. More particularly, the methods and apparatuses of the present invention relate to controlling the current draw of a wireless modem from a host power supply. The methods and apparatuses are particularly applicable, but not limited to, mult-time slot GSM (Global System for Mobile Communications)/GPRS (General Packet Radio Service) networks.

According to one aspect of the invention, a current limiter for a wireless modem includes a current sensor configured to measure a current drawn by a wireless modem from a power supply of a host device, a current-to-voltage converter coupled to the current sensor and operable to convert the measured current drawn by the wireless modem to a voltage representative of the measured current draw, a reference voltage generator operable to generate a reference voltage defining a maximum current that the modem may draw from the host device power supply, and a voltage comparator coupled to both the current-to-voltage converter and the reference voltage generator operable to compare the voltage representative of the measured current draw to the reference voltage and generate a current overdraw signal when the compare the voltage representative of the measured current draw is greater than the reference voltage.

According to another aspect of the present invention, a method of limiting the current draw of a PC card wireless modem from a host power supply includes the steps of determining a current drawn by the modem from the host power supply, converting the measured current to a voltage representative of the measured current draw, comparing the voltage representative of the measured current draw to the reference voltage, and generating a current overdraw signal when the voltage representative of the measured current draw exceeds the reference voltage.

Other aspects of the invention are described and claimed below, and a further understanding of the nature and advantages of the inventions may be realized by reference to the remaining portions of the specification and the attached drawings.

DETAILED DESCRIPTION

Figure 1:
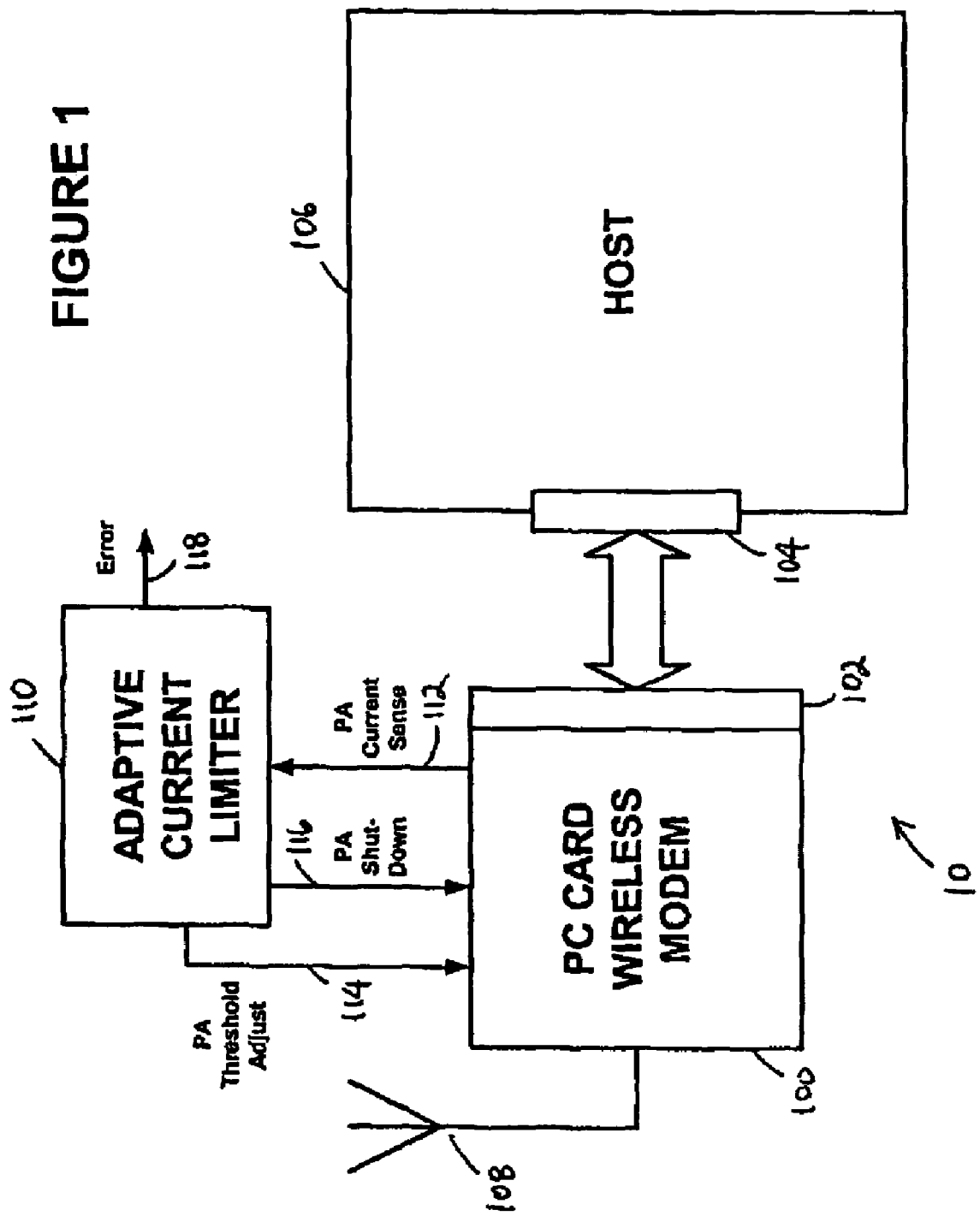
FIG. 1 shows a block diagram of an adaptive current limiting system, according to an embodiment of the present invention.

Referring to FIG. 1, there is shown a block diagram of an adaptive current limiting system 10, according to an embodiment of the present invention. System 10 comprises a PC card wireless modem 100, which includes baseband and RF components, and an adaptive current limiter 110. PC card wireless modem 100 includes a connector 102 for connecting PC card wireless modem 100 to a socket 104 of a host 106. Host 106 may comprise a laptop computer, a handheld computer, a personal digital assistant (PDA), or other device from which information (e.g. data) is to be radiated by an antenna 108 of wireless modem 100. As explained in more detail below, adaptive current limiter 110 monitors the instantaneous current of the power amplifier (PA) of wireless modem 100, via a PA sense line 112, and dynamically adjusts a current limit threshold of the PA, according to, for example, the host power supply capability, the number of transmission time (Tx) slots allocated per transmission frame, and the RF band of the transmit signal. Adaptive current limiter 110 may also be configured to send an over-current signal to wireless modem 100, via an over-current line 116, if for example, the current draw of the PA exceeds an over-current level. Adaptive current limiter 110 may also send an error signal to a user of the system, via host interface 102, if for example, the antenna mismatch is detected by system 10. It should be pointed out here that whereas system 10 shows the adaptive current limiter 110 and PC card wireless modem as comprising separate components, in an alternative embodiment the current limiter would comprise part of the wireless modem and, therefore, not be a separate component.

Figure 2:
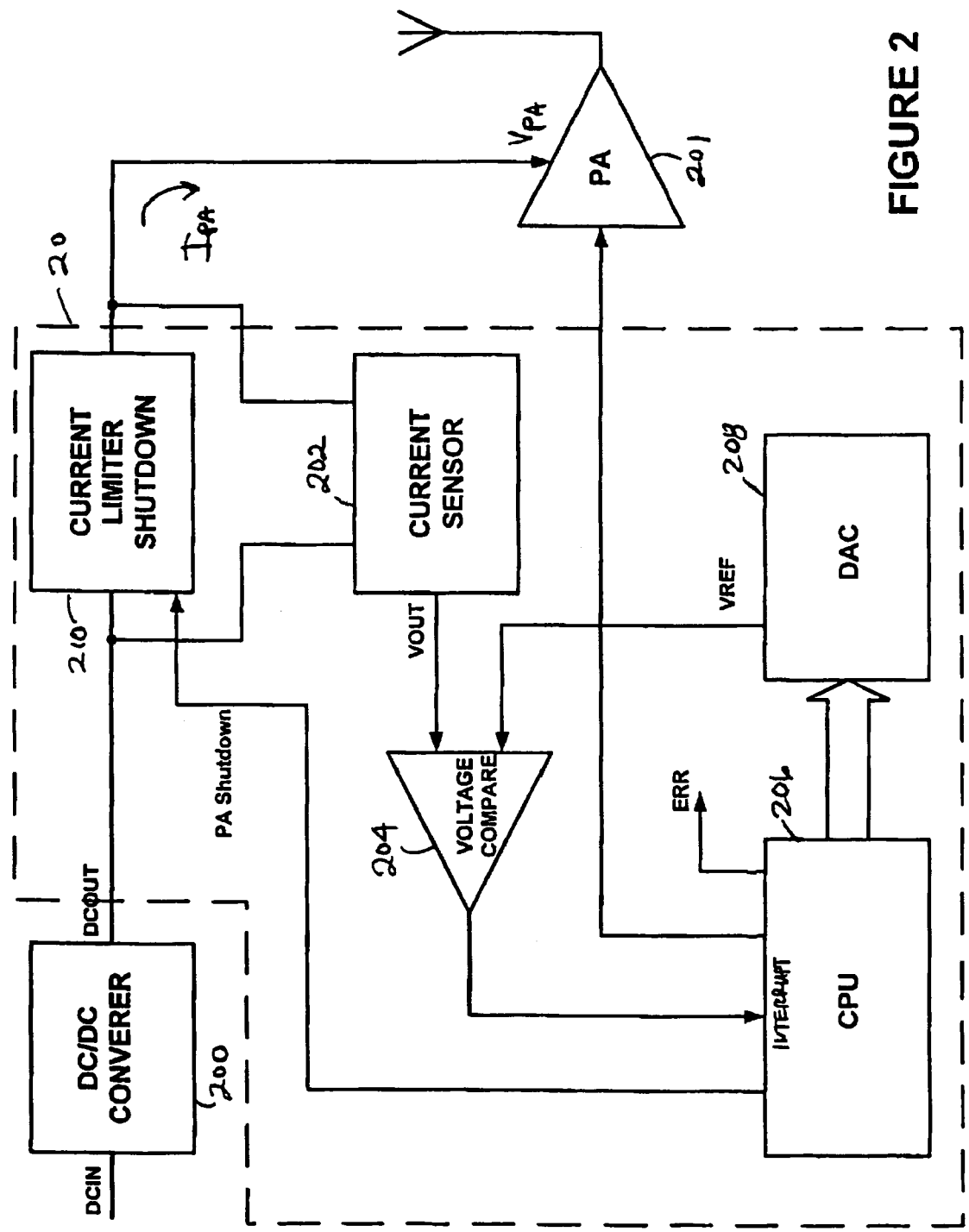
FIG. 2 shows an exemplary adaptive current limiter, which may be used in system shown in FIG. 1, according to an embodiment of the present invention.

Referring now to FIG. 2 there is shown an exemplary adaptive current limiter 20, which may be used in system 10, according to an embodiment of the present invention. Current limiter 20 is coupled to a DC/DC converter 200, which converts a DC input voltage DCIN from a power supply of a host device to a DC output voltage DCOUT. DC/DC converters are known in the art and, therefore, will not be described in detail here. DCOUT provides power to a PC card wireless modem, including the power amplifier (PA) 201 of the wireless modem, as shown in FIG. 2. In a specific exemplary embodiment, the host device power supply supplies a DC input voltage of 5 volts, DC/DC converter 200 is a buck type converter, which steps the DC input voltage down to an output voltage DCOUT having a nominal value of about 3.5 volts, and DCOUT is used to power a PCMCIA-compatible PC card wireless modem.

Current limiter 20 comprises a current sensor circuit 202, a voltage comparator 204, a central processing unit (CPU) 206 (e.g. a microprocessor, ASIC, or programmable controller), a digital-to-analog converter (DAC) 208 and a current limiter shutdown circuit 210. In addition to accepting the over-current signal to decouple the power source from PA 201 when the current source by PA 201 exceeds an over-current level, current limiter shutdown circuit 210 may provide secondary protection with a secondary, and possibly higher, fixed over-current threshold. A secondary fixed over-current threshold would be used, for example, if CPU 206 is for some reason unable to respond to the interrupt signal from comparator 204. This could happen, for example, if the firmware on the CPU is out of control. A device, which can be configured to perform the primary and secondary protection functions is part no. MIC2545A/2549A Programmable Current Limit High-Side Switch, sold by Micrel, Inc. Those skilled in the art will readily understand that other circuits may be used to perform these functions.

Current sensor circuit 202 detects the instantaneous DC current on the DC power rail of PA 201 and converts it to a voltage VOUT. VOUT is coupled to a first input of voltage comparator 204 and is compared to a reference voltage VREF, which is coupled to a second input of comparator 204. Reference voltage VREF is generated by DAC 208 and has a value that is adjustable by CPU 206. Other reference voltage generators may be used and those skilled in the art would readily understand this. CPU 206 is programmed to provide a digital signal, which as explained above is converted to an analog voltage by DAC 208, so that the VREF threshold is determined by one or more of the following: host power supply capability, the number of present Tx slots and the RF operational band. The output of voltage comparator 204 provides an interrupt signal to CPU 206, when VOUT is greater than reference voltage VREF, indicating that the instantaneous DC current drawn by PA 201 has exceeded a predetermined limit.

To enhance the accuracy of the adaptive current limiter circuitry, a pre-calibration process may be performed during factory testing. An exemplary pre-calibration process directs CPU 206 to program PA into different constant current draw states. For each of these current draw states, the DC current drawn by DC/DC converter 200 and the current sensor 202 output voltage VOUT are measured and recorded. The measured DC currents are then normalized and the VOUTs averaged. The normalized DC currents and averaged VOUTs are then used to determine an offset of the current limiter under test. The offsets may be stored in a none-volatile memory and used as compensation offsets that can be added to the reference voltage setting of voltage comparator 204. Whereas a voltage offset compensation table is described here, those skilled in the art will understand that other compensation tables may be developed and used. For example, a temperature compensation table may also be used to enhance the accuracy of the adaptive current limiter circuitry.

Figure 3:
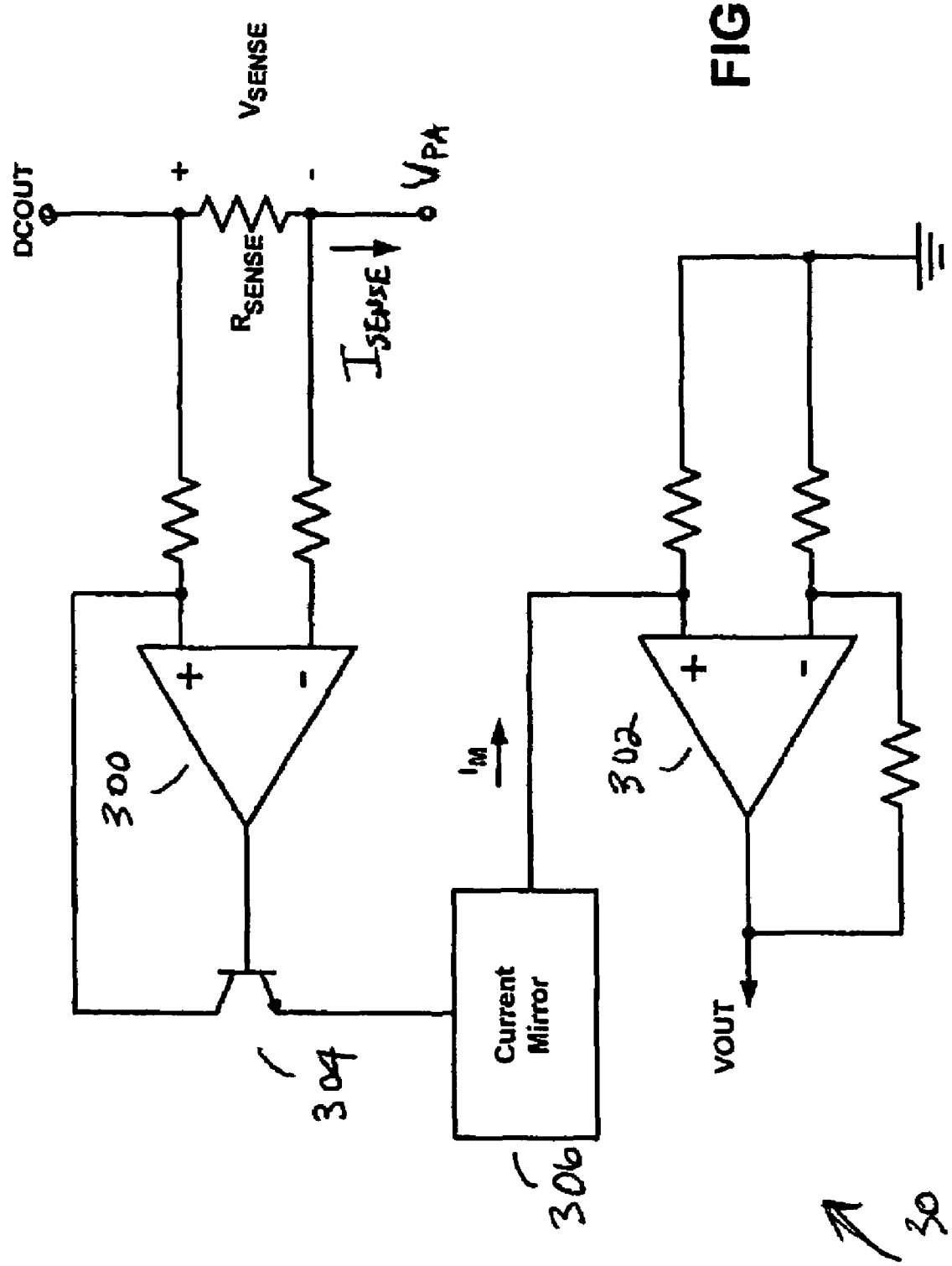
FIG. 3 shows an exemplary current sensor circuit, which may be used in the adaptive current limiter in FIG. 2, according to an embodiment of the present invention.

FIG. 3 shows an exemplary current sensor circuit 30, which may be used for the current sensor 202 in the adaptive current limiter in FIG. 2, according to an embodiment of the present invention. A sample ($I_{SENSE}$) of the current drawn by PA 201 produces a sense voltage drop $V_{SENSE}$ across a sense resistor $R_{SENSE}$. A mirror current $I_M$ representing the sensed voltage is mirrored from a first differential amplifier 300 to a second differential amplifier 302 via transistor 304 and current mirror 306. Second amplifier 302 is configured so that it produces VOUT, the voltage that is compared to VREF in FIG. 2. Other types of current-to-voltage circuits may be used for current sensor 202. Accordingly, those skilled in the art will readily understand that the current sensor circuit 30 in FIG. 3 is but one of many possibilities.

In a specific exemplary embodiment of the present invention, the adaptive current limiter 10 in FIG. 1 (or 20 in FIG. 2) is used to monitor and limit the current draw of a power amplifier in a PCMCIA wireless modem that is designed to conform to the multi-time slot GSM/GPRS communications protocol. In this particular embodiment, CPU 206 is programmed to instruct DAC 208 to provide a reference voltage VREF, which is dependent upon either a two-slot or four-slot transmission burst (i.e. class 10 or class 12 operation). Other parameters, such as for example, the current supplying ability of the host power supply or the frequency band of the signal transmitted by the wireless modem may be used to define the reference voltage VREF. According to this exemplary embodiment, the current draw threshold of adaptive current limiter 10 is adaptive to the one or more of the following conditions: (i) the type of host 106 that is being used, (ii) the number of TX time slots being used, and (iii) the RF frequency band of which the modem 100 is operating. The latter two conditions may change over time. Accordingly, a controller in the adaptive current limiter 110 (e.g. CPU 206 in FIG. 2) may be configured to adjust the current limiter threshold voltage VREF dynamically based on changes in these conditions in real time.

CPU 206 may be programmed to respond to an interrupt signal indicative of a current overdraw condition in various ways. For example, in response to the interrupt signal, CPU 206 may be programmed so that an error signal ERR is sent to a user, the error signal prompting the user to adjust the antenna of the PC card wireless modem. CPU 206 may also be programmed to provide a current draw reduction signal to an input of PA 201 and/or may be programmed to produce a signal to reduce the number of Tx time slots used per transmission burst, in response to the interrupt signal. This response can protect the wireless modem from overheating the host power supply from being damaged or from resetting. Finally, CPU 206 may also be programmed to send a signal to the user that the antenna may have been damaged or broken, if the modem continues operating in a protected mode for an extended period of time.

In an alternative embodiment, if CPU 206 is capable of checking current sensor 202 output VOUT directly at the beginning of each Tx slot, DAC 208 and comparator 204 may be eliminated. According to this alternative embodiment VOUT would be coupled directly to CPU 206 and ADC and CPU firmware could periodically poll the PA current on, for example, every TX time slot.

Whereas the above is a complete description of the preferred embodiments of the invention, various alternatives, modifications, and equivalents may be used. Therefore, the above description should not be taken as limiting the scope of the invention, which is defined by the appended claims.

What is claimed is:

1. A method of limiting the current draw of a PC card wireless modem from a host power supply, said method comprising:
    measuring a current drawn by a PC card wireless modem from a host power supply;
    converting the measured current draw to a voltage representative of the measured current draw;
    comparing the voltage representative of the measured current draw to an adjustable reference voltage; and
    adjusting said adjustable reference voltage as a function of one or more of host power supply capability, number of transmission slots, and RF operational band in order to establish a maximum permissible current that may be drawn by the wireless modem from the host power supply.

2. The method of claim 1 wherein the maximum permissible current that may be drawn by the wireless modem from the host power supply is set depending on a current supplying capability of the host power supply.

3. The method of claim 1 wherein the PC card wireless modem comprises a PCMCIA compatible PC card.

4. A current limiter for a wireless modem, comprising:
    a current sensor configured to measure a current drawn by a wireless modem from a power supply of a host device;
    a current-to-voltage converter coupled to the current sensor and operable to convert the measured current drawn by the wireless modem to a voltage representative of the measured current draw;
    a dynamically adjustable reference voltage generator operable to generate a reference voltage defining a maximum current that the wireless modem may draw from the host device power supply, said reference voltage being a function of one or more of host power supply capability, number of transmission slots, and RF operational bands; and
    a voltage comparator coupled to both the current-to-voltage converter and the dynamically adjustable reference voltage generator operable to compare the voltage representative of the measured current draw to the reference voltage and generate a current overdraw signal when the voltage representative of the measured current draw is greater than the reference voltage.

5. The current limiter of claim 4 wherein the voltage generator comprises:
    a central processing unit (CPU) having an interrupt input configured to receive the current overdraw signal and a digital output; and
    an analog-to-digital converter (DAC) configured to receive a digital output signal from the CPU digital output and convert it to the reference voltage.

6. The current limiter of claim 4 wherein the current overdraw signal is used to control the amount of current the wireless modem may draw from the host power supply.

7. The current limiter of claim 4 wherein the wireless modem comprises a PCMCIA compatible PC card.

8. A wireless modem, comprising:
    a current sensor configured to measure a current drawn by the wireless modem from a power supply of a host device;
    a current-to-voltage converter coupled to the current sensor and operable to convert the measured current drawn by the wireless modem to a voltage representative of the measured current draw;
    a reference voltage generator operable to generate a reference voltage defining a maximum current that the wireless modem may draw from the host device power supply; and
    a voltage comparator coupled to both the current-to-voltage converter and the reference voltage generator operable to compare the voltage representative of the measured current draw to the reference voltage and generate a current overdraw signal when the voltage representative of the measured current draw is greater than the reference voltage,
    wherein said reference voltage generator is dynamically adjustable during operation of the wireless modem to vary the reference voltage defining the maximum current that the wireless modem may draw from the host power supply, and is a function of one or more of host power supply capability, number of transmission slots, and RF operational bands.

9. The wireless modem of claim 8 wherein the voltage generator comprises:
    a central processing unit (CPU) having an interrupt input configured to receive the current overdraw signal and a digital output; and
    an analog-to-digital converter (DAC) configured to receive a digital output signal from the CPU digital output and convert it to the reference voltage.

10. The wireless modem of claim 8 wherein the current overdraw signal is used to control the amount of current the wireless modem may draw from the host power supply.

11. The wireless modem of claim 8 wherein the wireless modem is PCMCIA compliant.

12. The method of claim 1, further comprising generating a current overdraw signal when the voltage representative of the measured current draw exceeds the adjustable reference voltage.

13. The method of claim 12 wherein the current overdraw signal is used to control the amount of current the PC card wireless modem may draw from the host power supply.

* * * * *